US009652536B1

(12) United States Patent
Stasior et al.

(10) Patent No.: US 9,652,536 B1
(45) Date of Patent: May 16, 2017

(54) DATA UPLOAD VIA ELECTRONIC COMMUNICATIONS

(75) Inventors: William F. Stasior, Los Altos, CA (US); Matthew W. Amacker, Santa Clara, CA (US); Charles B. Pinkerton, Woodside, CA (US); Asif Mansoor Ali Makhani, San Jose, CA (US)

(73) Assignee: A9.COM, Inc., Palo Alto, CA (US)

( * ) Notice: Subject to any disclaimer, the term of this patent is extended or adjusted under 35 U.S.C. 154(b) by 799 days.

(21) Appl. No.: 13/348,582

(22) Filed: Jan. 11, 2012

(51) Int. Cl.
*G06F 17/30* (2006.01)

(52) U.S. Cl.
CPC .............. *G06F 17/30864* (2013.01)

(58) Field of Classification Search
CPC ......... G06F 17/30864; G06F 17/30067; G06F 17/30545; G06F 17/30595; G06Q 30/02
USPC .......................................... 707/737; 709/206
See application file for complete search history.

(56) References Cited

U.S. PATENT DOCUMENTS

| 6,405,243 | B1* | 6/2002 | Nielsen ........................... 709/206 |
|---|---|---|---|
| 2006/0031357 | A1* | 2/2006 | Misra et al. ................... 709/206 |
| 2008/0059419 | A1* | 3/2008 | Auerbach et al. ................ 707/3 |
| 2009/0157732 | A1* | 6/2009 | Hao et al. ...................... 707/102 |
| 2010/0094947 | A1* | 4/2010 | Daniell et al. ................. 709/206 |
| 2010/0281397 | A1* | 11/2010 | Buchheit et al. .............. 715/752 |

OTHER PUBLICATIONS

"How do I search for a email, for attach attachments, or for text?" retrieved on Nov. 19, 2011, from http://help.yahoo.com/l/us/yahoo/mail/yahoomail/manage/manage-01.html;_ylt=AqTZmS3y2Yr . . . , 2 pages.
"How to search for content with the attachment?" retrieved on Nov. 19, 2011, from http://www.google.com/support/forum/p/gmail/thread?tid=74e5250633ba52fa&hl=en, 3 pages.
Sena, T., "The Ultimate Guide to Gmail," retrieved on Nov. 19, 2011, from http://manuals.makeuseof.com.s3.amazonaws.com/gmail-guide.pdf, 35 pages.

\* cited by examiner

*Primary Examiner* — Cam-Y Truong
(74) *Attorney, Agent, or Firm* — Seed IP Law Group LLP

(57) ABSTRACT

Techniques are described for using electronic communications to enable users to supply data to an online service, such as a fee-based online search functionality service that provides user-specific data searching capabilities. The electronic communications may, for example, be email communications, and may be used to supply data in various manners, such as based on the communications' body contents and/or file attachments. In addition, users may configure various types of data analysis or manipulation operations to be performed on data supplied via electronic communications. After a user's data has been supplied to and optionally manipulated by the online service in a configured manner, that user (or others to whom that user provides access) may access that data from the online service in various manners, including by using one or more data retrieval access interfaces that are distinct from an electronic communication address used to supply the data.

22 Claims, 9 Drawing Sheets

Example Email-Based Product Catalog Data Intake

↙‾‾291

*291a* From: AdministratorZZZ@retailerABC.com
*291b* Date: Mon 3/5/20XX 9:09AM
*291c* To: retailerABC_products@<user-data-search-service>.com
*291d* Subject: Catalog:Replace
*291e* Header-UDSS-1:
*291f* Attachments: "catalog-listing-ABC (20XX-03-05).<filetype>"

*291g* {

*294*

| | Product Name | Product ID | Category | |
|---|---|---|---|---|
| | *296a* | *296b* | *296c* | |
| *295a* | ItemABC | 0061957823 | Books | ... |
| | ⋮ | | | |
| *295b* | ItemXYZ | 0061912307 | Books | |
| *295c* | ItemDDD | B005OG3RO8 | Clothes | |
| | ⋮ | | | |

*Fig. 2A*

Example Email-Based Product Inventory Update Data Intake

292

- 292a From: AdministratorZZZ@retailerABC.com
- 292b Date: Mon 3/5/20XX 3:27PM
- 292c To: retailerABC_products@<user-data-search-service>.com
- 292d Subject: Inventory:Update

- 292g product: ItemXYZ
- 292h quantity: 1

Example Email-Based Product Review Data Intake

293

- 293a From: UserYYY@retailerABC.com
- 293b Date: Mon 3/6/20XX 3:45PM
- 293c To: retailerABC_reviews@<user-data-search-service>.com
- 293d Subject: ItemXYZ is a great value despite some flaws

- 293i I bought ItemXYZ for use in the kitchen, and was worried about whether it was sturdy enough for daily use, but I've been pleasantly surprised ...

- 293j Rating: 4-star

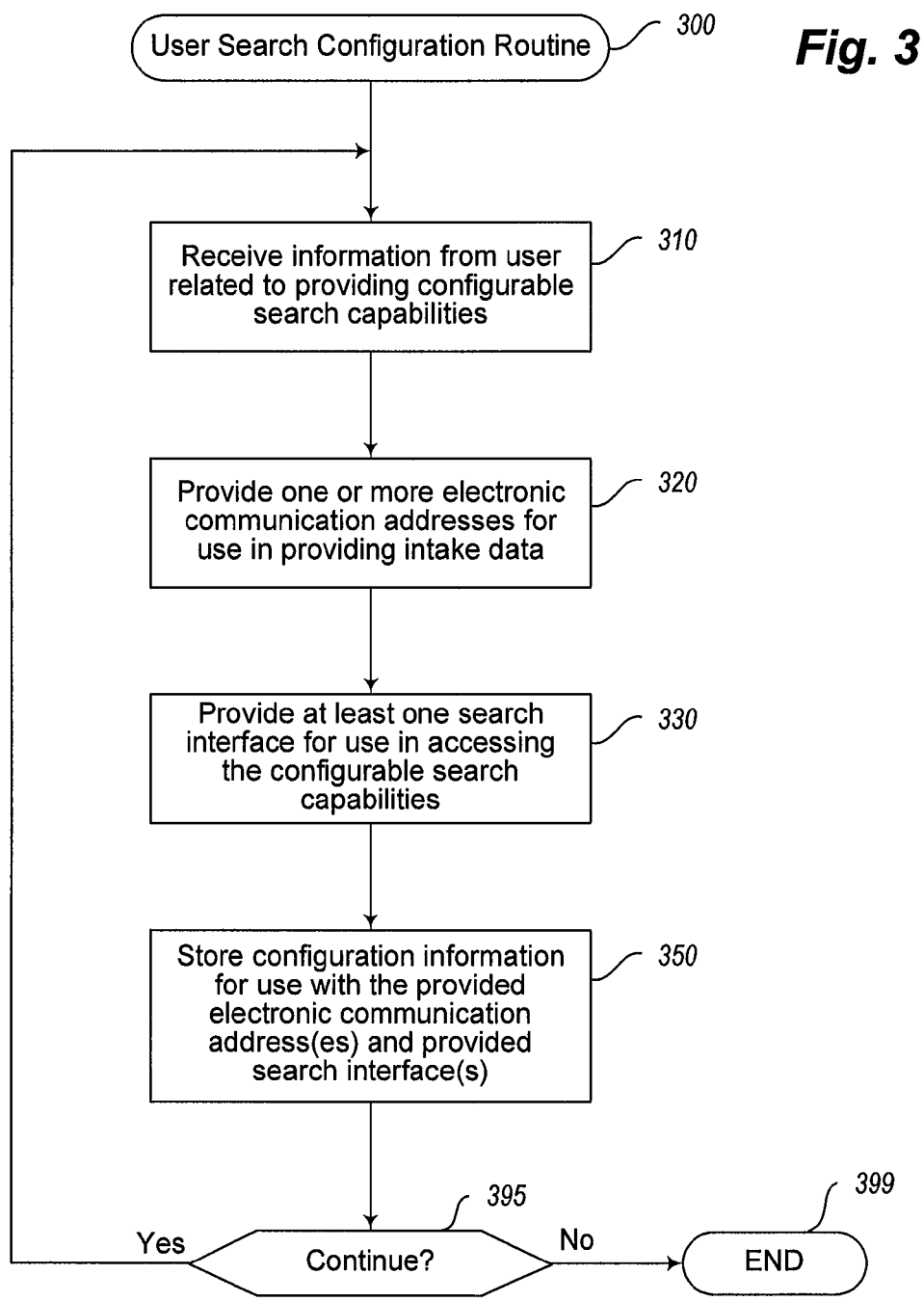

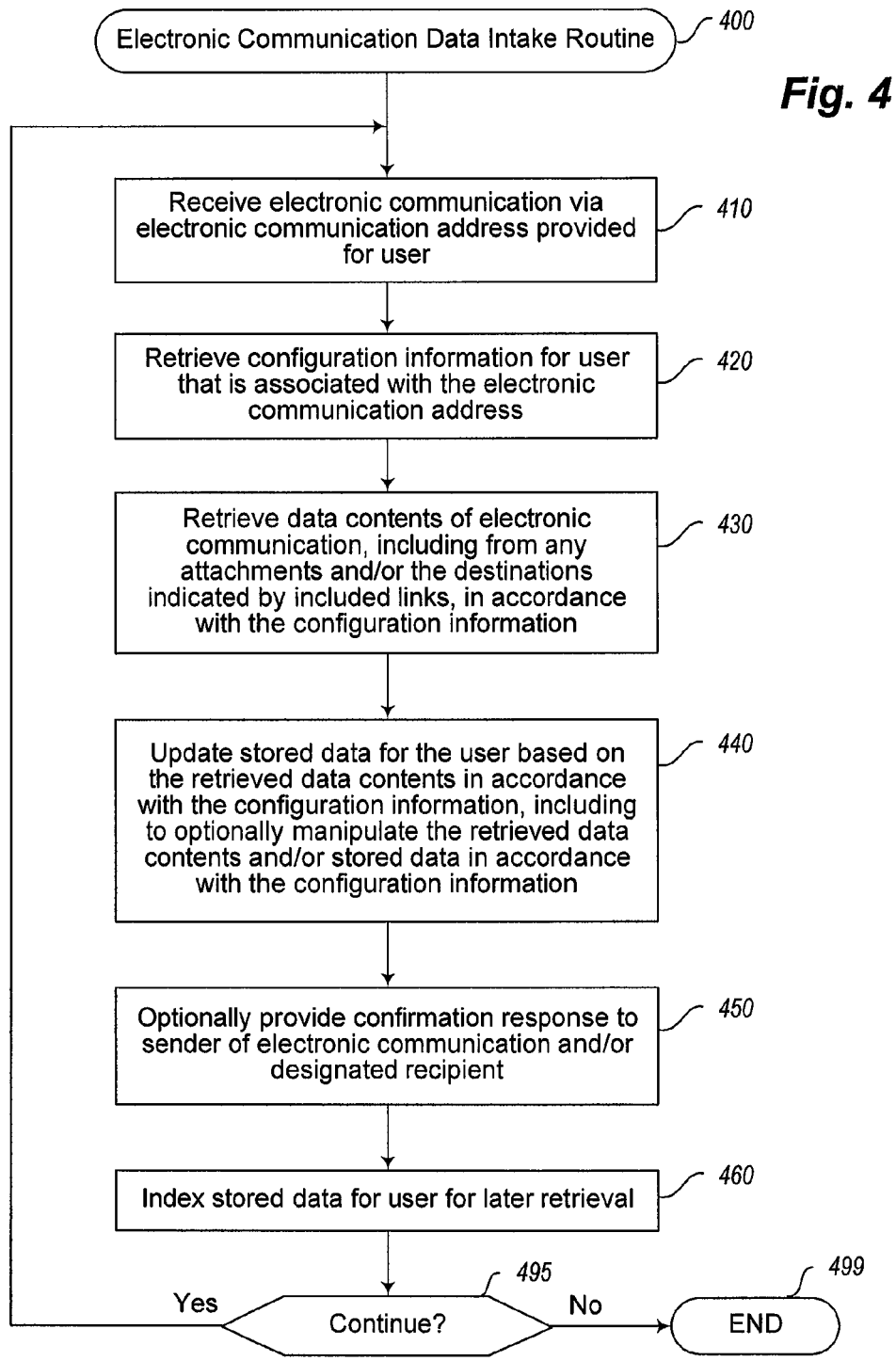

DATA UPLOAD VIA ELECTRONIC COMMUNICATIONS

BACKGROUND

Some types of online services rely on receiving various data from users, such as if the services provide user-specific data analysis or other user-specific functionality based on the received data. However, for many users, it is difficult to effectively supply the data of interest to the online services, particularly if the data to be supplied is received incrementally over time or otherwise changes frequently.

BRIEF DESCRIPTION OF THE DRAWINGS

FIGS. 2A-2F illustrate examples of using electronic communications to upload data to an online service and to later access that data in various manners.

FIG. 3 is a flow diagram of an example embodiment of a user search configuration routine for use with an example user-specific data search service.

FIG. 4 is a flow diagram of an example embodiment of an electronic communication data intake routine for use with an example user-specific data search service.

DETAILED DESCRIPTION

Figure 1:
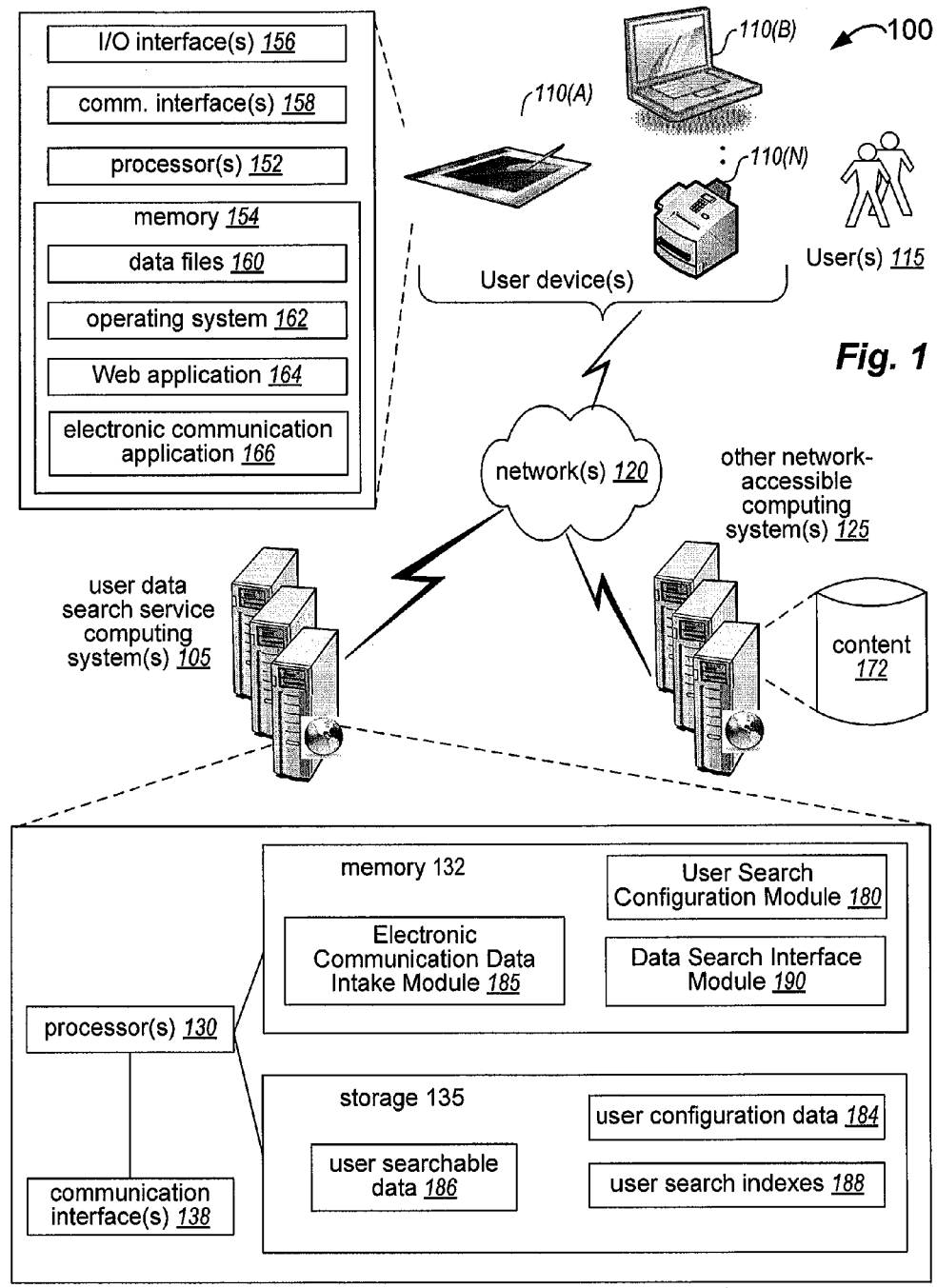
FIG. 1 illustrates an electronic environment in which various embodiments may be implemented.

Techniques are described for using electronic communications to enable users to supply data to an online service, for later access or use in one or more manners. The electronic communications may be used to upload or otherwise supply data to an online service in various manners, including in particular embodiments based on one or more of the body contents of an electronic communication, on file attachments of an electronic communication, on header fields or other metadata included with the electronic communication, on externally stored documents or other external storage locations that are referenced by the electronic communication, etc. The electronic communications may be email communications in some embodiments, while in other embodiments other types of electronic communications may be used. In additions, in some embodiments and situations, users may configure various types of data manipulation operations that an online service is to perform on data received via such electronic communications. After data for a user has been supplied to an online service and optionally manipulated by the online service in one or more configured manners, that user (or other users to whom that user provides access) may retrieve or otherwise access that data from the online service in various manners, including by using one or more data retrieval access interfaces that are distinct from the electronic communications used to supply the data to the online service.

The described techniques may be used in a variety of types of environments and situations, including with a variety of types of online services. As one illustrative example, the described techniques may be used with an online user data search service that provides user-specific data manipulation and searching capabilities to users of the service, such as in exchange for fees paid by the users. For example, when such a user registers with such a user data search service, the user data search service may provide the user with one or more email addresses or other electronic communication addresses managed by the user data search service, so that the user may send emails or other electronic communications to the provided electronic communication address(es) that include user-specific data to be supplied to the user data search service for later use on behalf of that user. The user data search service may also provide the user with one or more data retrieval interfaces that are separate from the provided electronic communication address(es), such as one or more programmatic search interfaces (e.g., via an API, or application programming interface, of the user data search service that may be accessed by an executing software program of a user) to request and receive portions of the user-specific data that satisfy any specified search criteria, and/or one or more interactive search interfaces via which the user may manually browse or search the user-specific data.

A user of the user data search service may also optionally configure particular data analysis operations or other data manipulation operations that the user data search service is to perform on supplied user-specific data, such as to perform different types of data manipulation for electronic communications received using different electronic communication addresses provided to the user, and/or based on instructions supplied in a particular electronic communication (e.g., using a header field of the communication, using a tag or other specified parameter in the body of the communication, etc.) that specify one or more types of data manipulation operations to be performed for the data supplied by that particular electronic communication. In other embodiments and situations, the user data search service may perform predefined types of data manipulation operations on specified types of supplied data, such as to provide default data manipulation operations that are used unless a particular user configures other types of behavior.

After the user data search service has provided the electronic communication address(es) to a particular user, the service may receive various types of user-specific data supplied by or on behalf of that user, optionally analyze or otherwise manipulate that received data in various manners, and then provide later access to that user-specific data to that particular user (or other users to whom that particular user provides access). In addition, to facilitate the later retrieval of the user-specific data, the user data search service may in some situations generate one or more search indexes based on the user-specific data. Subsequently, the user data search service receives data access requests that are each associated with one of the users of the service, and provides access to that user's data as appropriate, such as based on any access-related configuration specified by that user, and by using any search indexes generated for that user's data. In such embodiments, some or all of the described techniques may be provided by automated operations of the user data search service.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes one or more electronic client (user) devices 110(A)-110(N), which may each be any appropriate device operable to send and receive requests, messages, or information over an appropriate network 120 and convey information back to a respective user 115 of the device 110. Examples of such client devices include personal computers, smart phones and other cell phones, handheld messaging devices, laptop computers, set-top boxes, personal data assistants, tablet PCs, server devices, electronic cash registers and other POS ("point of sale") devices, and the like. The client devices 110(A)-110(N) in this example each may include one or more processors 152 (e.g., CPUs) and memory 154 for storing data files 160, an operating system 162, one or more web applications 164 (e.g., a Web browser), and one or more electronic communication applications 166 (e.g., an email program). The devices 110(A)-110(N) may further include at least one or more of the following elements: input/output interface (e.g., a display or a screen, a keyboard, a microphone, speakers, etc.) 156 and communication interface 158 (e.g., an Ethernet connection, a Wi-Fi connection, a USB port, etc.).

The illustrative environment 100 also includes one or more server computing systems 105 that are configured to perform some or all of the described techniques, with the server computing systems 105 providing a user data search service is this example embodiment. In addition, the illustrative environment 100 may optionally include one or more other network-accessible computing systems 125 that store various content 172, which may be accessed and used by the user data search service in various manners. The server computing system(s) 105 are illustrated in this example as including one or more processors 130 (e.g., CPUs) that may be connected to a communication interface 138, memory 132, and storage 135. The memory 132 in this example includes a configuration module 180, an electronic communication data intake module 185, and a data retrieval interface module 190, with each module including executable software instructions to configure the server computing system(s) 105 to perform associated functionality when executed by the processor(s) 130, in order to provide some or all of the described techniques. The storage 135 in this example includes user configuration data 184 for various users of the user data search service, user searchable data 186 that has been received for various users of the user data search service, and optionally user search indexes 188 that have been generated for some or all of the user searchable data 186. Additional details are included below regarding operation of the modules 180, 185 and 190 to provide the described techniques, and use of the user configuration data 184, user searchable data 186 and user search indexes 188.

FIGS. 2A-2F illustrate examples of use of the environment 100 of FIG. 1 by an example user in particular manners, who interacts with an embodiment of the user data search service to configure and use multiple particular types of searching capabilities. For illustrative purposes, some embodiments are described below in which specific types of operations are performed, including use of particular types of electronic communications and configuration of search-related capabilities, and in which specific types of devices and data are used. These examples are provided for illustrative purposes and are simplified for the sake of brevity, and the inventive techniques may be used in a wide variety of other situations, some of which are discussed below.

In particular, in the examples of FIGS. 2A-2F, a user of the user data search service is affiliated with an online retailer that uses a Web site to perform various transactions and other interactions with customers. The retailer-affiliated user (also referred to below as the "retailer user") registers with the user data search service and configures various types of search-related capabilities to be provided by the user data search service, which enable the retailer user to provide various types of functionality to customers of the Web site and to receive functionality related to operation of the retailer's business.

In particular, FIG. 2A involves an electronic communication being sent to the user data search service at a time after the user has registered with the user data search service and has configured various types of capabilities to be provided by the user data search service. In the example of FIG. 2A, an email communication 291 is illustrated that the user has sent to the user data search service using a first electronic communication address provided by the user data search service, in order to supply data to the user data search service in a manner that will initiate a first type of search-related capabilities provided by the user data search service. The user in this example is sending the email from an email account associated with the example retailer (referred to in this example as "retailerABC"), with an example username of "AdministratorZZZ" for the retailer user, as indicated in header information 291a of the received email. In this example, the first electronic communication address provided by the user data search service is an email address "retailerABC_products@<user-data-search-service>.com" that is indicated in the "To:" header field 291c of the received email, with the "<user-data-search-service>.com" representing a domain name controlled by the user data search service in this example.

In this example, the first type of search-related capability configured by the user is to allow customers of the retailer's Web site to perform searches for product inventory that is currently available from the retailer. In order to enable such searching capabilities, the user provides intake data to the user data search service that identifies product information for a product catalog available from the retailer, such as by providing an attached file to the email 291. In the illustrated example, the attached file is indicated in header information 291f of the received email communication, and a view 294 is illustrated of some of the contents of the attached file for reference purposes, although the information 294 is not part of the body 291g of the email communication (which is blank or empty in this example). The user/retailer may supply such product catalog data to the user data search service at various times and in various manners, such as to periodically send new data that indicates a current catalog of the retailer (e.g., to replace any previously sent catalog data, such as to enable the retailer to update inventory as new products become available and previously available products become unavailable). In other embodiments and situations, the user/retailer may instead send updated catalog data to the user data search service that is intended to modify existing catalog data, such as to supplement existing stored data by adding new product information and/or by removing existing product information that is no longer accurate.

In the illustrated example, the attached file includes various rows 295 and columns 296, such as may correspond to a spreadsheet program, a table within a word processing program, etc., although in other embodiments the data may be represented in other manners (e.g., using tags, such as for data specified using an XML, or "eXtensible Markup Language," format). In this example, each row of the attached file corresponds to a product, and each column indicates various types of information for the product, such as to include a product name in column 296a, a unique identifier for the product in column 296b, category information for the product in column 296c, etc. It will be appreciated that a variety of other types of information may be included and represented in other manners in other embodiments.

As previously noted, the data supplied in the email communication 291 has been configured by the user to initiate a first type of search-related capability from the user data search service, whether based on the user accepting a default search-related capability provided by the user data search service, or instead based on the user specifying custom search-related capability. The first type of search-related capability is triggered in this example based at least in part on configuration instructions supplied as part of the email communication 291, optionally in association with the use of the first provided email address that is used. In particular, the subject field 291*d* header information for the email communication includes keywords in this example that the user specifies to correspond to a particular search-related operation to be performed, which in this example is "Catalog:Replace" to indicate to replace the existing product catalog of the retailer with new catalog information included in the email communication 291. In other embodiments, the user and/or the user data search service may instead not use such operation information in the header of the electronic communication (e.g., if different provided electronic communication addresses are used for different types of operations), or may instead specify such operation-related instructions in other manners (e.g., by using other specialized header fields of the communication that include information specific to the user data search service ("UDSS"), such as example header field 291*e* (whose contents are empty in this example); by including parameters or other instruction-related information in the body of the email communication, not shown in this example; etc.).

Thus, after the user data search service receives the email communication 291 from the user, the user data search service analyzes the included data in the attached file in accordance with the configuration information specified by the user, and stores the data for later use on behalf of the user. For example, the user may also have previously specified configuration information related to the structure of the attached file and how to analyze that information, while in other embodiments the user data search service may provide default capabilities for data stored in such a row-column format, such as to treat each row as corresponding to a unique item and to treat each column as an attribute or field for the corresponding items. The analysis of the included data in the attached file by the user data search service may include, for example, indexing the product catalog data with respect to one or more fields (e.g., product name, product ID, etc.) and storing corresponding generated search indexes for later use, or otherwise grouping the product catalog data in one or more manners (e.g., based on product category).

Figure 2B:
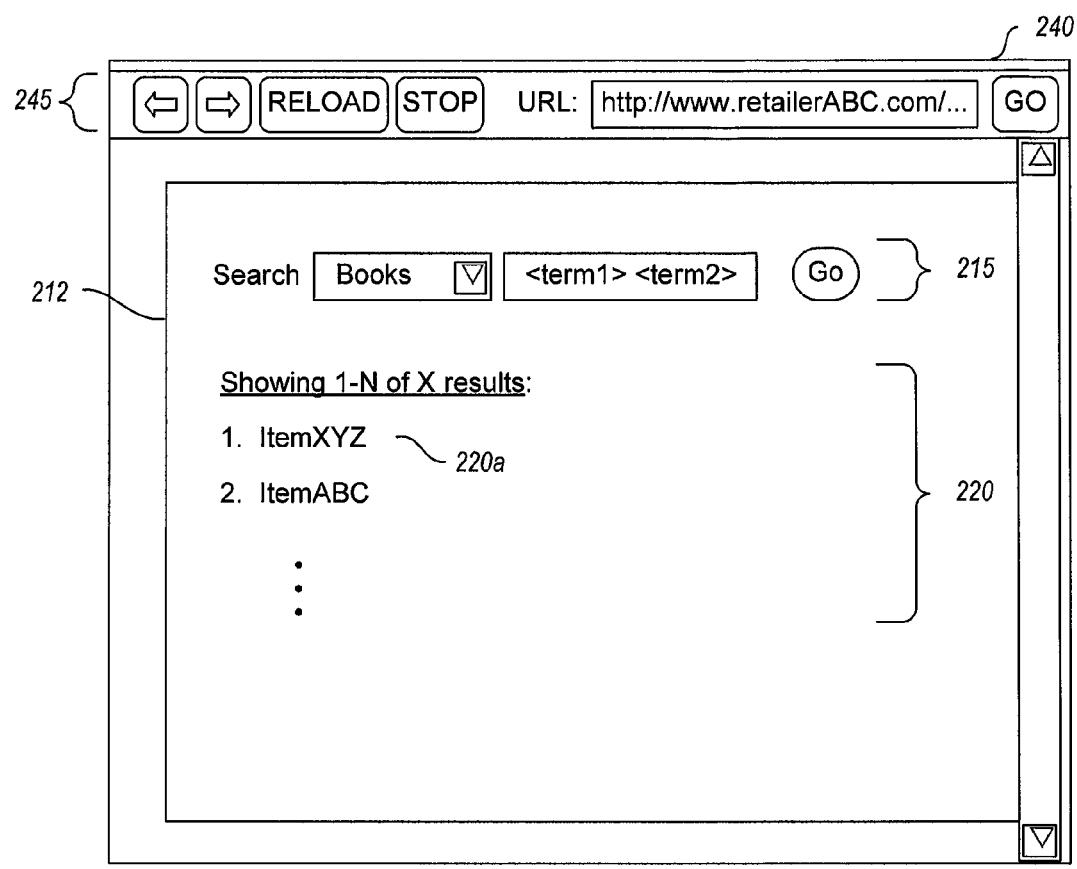

FIG. 2B continues the example of FIG. 2A, and illustrates an example of a Web page 212 that may be provided by the Web site of the retailer to enable customers at the Web site to perform searches for products available from the retailer. In the illustrated example, the Web page 212 is displayed within a program interface 240 that includes various user-selectable controls 245, and the Web page 212 includes various information displayed within the program interface. The Web page 212 in this example includes various user-selectable controls 215 that enable a current customer of the retailer who displays the Web page 212 to perform a search, which in this example includes the customer optionally specifying a particular category of product (e.g., "Books") and entering one or more search terms in a user-editable field, with the search triggered by selection of the "Go" user-selectable button control. The Web page 212 in this example further includes search results information 220 that corresponds to the search specified using the controls 215, including a list of various items that are available from the retailer that match the search request.

In this example, the Web page 212 is configured to, upon selection of the "Go" button by a customer, make a programmatic request to the user data search service to access stored user catalog data for the retailer user, such as by invoking an API of the user data search service and providing the specified search terms, product category, and optionally information specific to the retailer user (e.g., a unique identifier that is associated with the user by the user data search service, user credential information, etc.). In other embodiments, the user data search service may instead provide a distinct API for each registered user, and if so, user-specific information may not be provided as part of a programmatic interaction with the user data search service. While not illustrated here, it will be appreciated that in some embodiments a user of the user data search service may access stored data in multiple manners, such as to have a programmatic interface such as that illustrated with respect to FIG. 2B, and also have a separate interactive interface via which the user may access stored information. For example, the retailer user may be enabled to log in to an account of the user with the user data search service, and manually inspect, browse, or otherwise access stored user data related to the product catalog of the user, including to optionally make modifications in at least some embodiments.

When results to the programmatic request are received in this example, the Web page 212 is updated to include the search results information 220, whether by modifying the Web page from which the "Go" button was selected, or by generating and displayed a new Web page. In this example, it will be appreciated that the search results that are shown in FIG. 2B correspond to information that was previously supplied to the user data search service in electronic communication 291 of FIG. 2A, with the first item 220*a* ("ItemXYZ") in the search results being shown in row 295*b* of FIG. 2A, with the second search results item in FIG. 2B corresponding to row 295*a* of FIG. 2A, etc.

Thus, in the examples described with respect to FIG. 2A and FIG. 2B, the retailer user provides product catalog data to the user data search service via one or more electronic communications, and others may later access the stored user data by performing searches using a separate search interface provided by the user data search service.

Figure 2C:
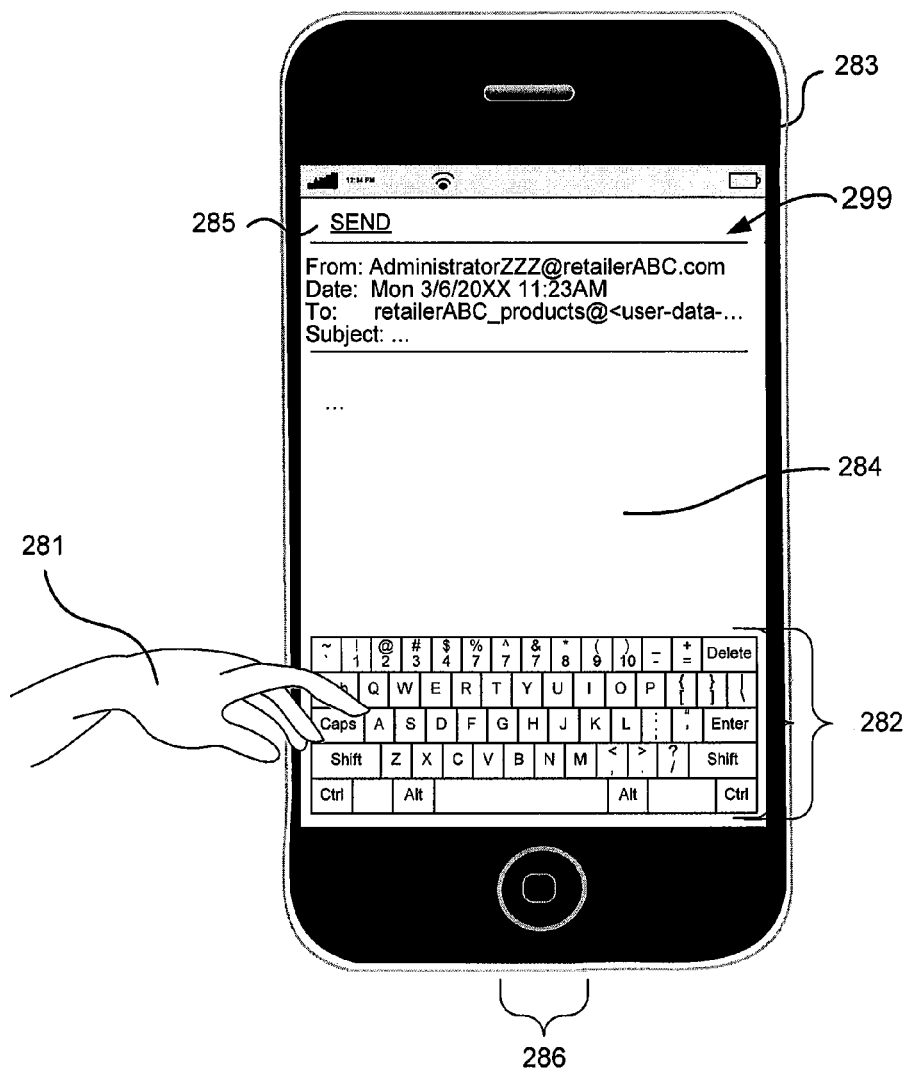

Electronic communications may be sent to the user data search service by or on behalf of the user registered with the user data search service at various times and in various manners. For example, as previously discussed with respect to FIG. 2A, the user may manually initiate the sending of at least some such electronic communications in particular situations. FIG. 2C illustrates an example of one manner in which the user may manually specify and send such an electronic communication, such as by using a client device 283 to manually enter the electronic communication to be sent. In other situations, at least some such electronic communications may instead be sent based on automated operations of computing systems under control of the user, as discussed in greater detail with respect to FIGS. 2D-2F. In yet other situations, electronic communications may be sent on behalf of the user by other computing systems that are not under control of the user, such as for a third-party system to provide information to the user using an electronic communication address provided by the user. In the example of FIG. 2C, the client device 283 is a handheld device, in which the user (represented by hand 281) manually enters an email 299, as shown on the display 284 of the device using a keyboard 282 (whether with physical keys or on-screen virtual keys), and in which the user manually specifies to send the email using displayed control 285. In some embodiments, the display may be touch-sensitive, such as to allow direct user selection of the displayed control 285, and in other embodiments the user may use one or more hardware controls 286 to select the control 285 and perform other interactions with the device 283. In other such embodiments, the user may use other types of client devices, and manually specify and send electronic communications in other manners, as discussed in greater detail elsewhere.

Figure 2D:
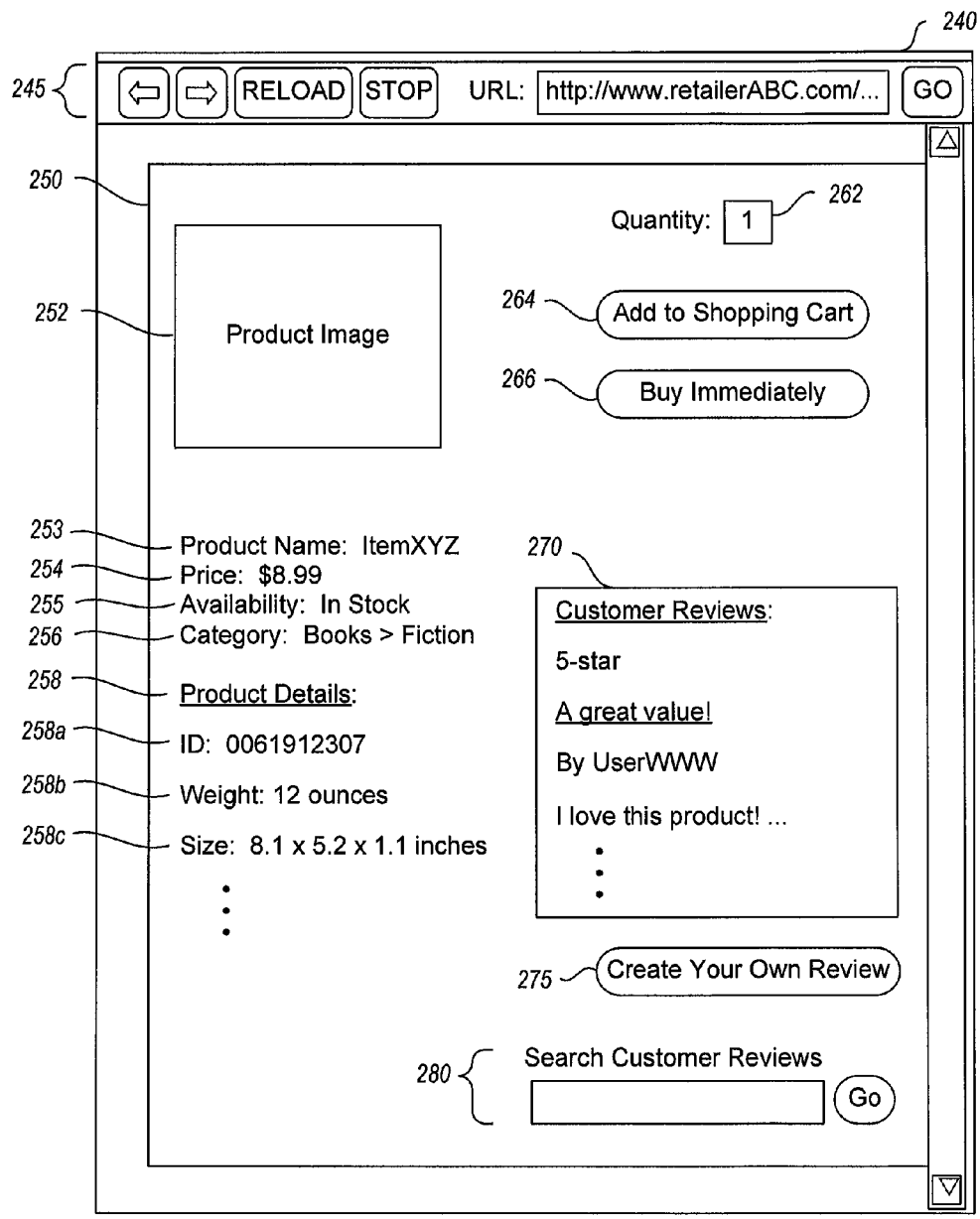

FIG. 2D continues the examples of FIGS. 2A and 2B, and in particular illustrates a Web page 250 that is provided to the same customer of the retailer that was previously discussed with respect to FIG. 2B (e.g., after the customer selects a user-selectable link, not shown, corresponding to the first search results item 220*a*). In the illustrated example of FIG. 2D, the program 240 is similarly illustrated with user-selectable controls 245, but in the example of FIG. 2D is displaying the distinct Web page 250. In this example, the Web page 250 contains detailed information about a particular product, such as a product image 252, product name 253 (which in this example is "ItemXYZ"), product price 254, product availability information 255, product category information 256, and various other product details 258. In addition, user-selectable controls 262, 264, and 266 are available to enable the customer to perform transaction-related operations, such as to specify a quantity in user-editable field 262 of the ItemXYZ product, to add the indicated quantity of the ItemXYZ product to the customer's virtual shopping cart using control 264, or to instead immediately buy the indicated quantity of the ItemXYZ product using control 266 without separately adding the item to the virtual shopping cart.

In the illustrated example, the retailer user has further configured the search-related capabilities of the user data search service to provide a second type of searching capability, and in particular to enable the retailer user to manage inventory information for the products that are available via the retailer. Thus, the retailer user first supplies intake data to the user data search service that includes inventory information for the products of the retailer, such as via a quantity column 296 (not shown) in the attached file in FIG. 2A, or instead by supplying one or more other electronic communications that include inventory data for the retailer. The retailer user may then further configure one or more transaction-related portions of the retailer's Web site to send electronic communications to the user data search service to update inventory information for the retailer in accordance with transactions that occur. For example, in the illustrated example, the "Buy Immediately" control 266 may be configured to, upon selection by the customer to whom the Web page 250 is displayed, initiate various operations of the retailer to fulfill an order from the current customer for the indicated quantity of the current product, and may also be configured to initiate an electronic communication to the user data search service to update inventory of the retailer to indicate that the current indicated quantity of the product is no longer available. FIG. 2E illustrates an example communication 292 that may be generated by customer selection of control 266 from the Web page of FIG. 2D, or alternatively from other portions of the Web site (e.g., from a shopping cart portion of the Web site, such as after the customer completes a checkout process via the shopping cart).

In the illustrated example of FIG. 2E, the email communication 292 has similarities to the email communication 291 previously illustrated with respect to FIG. 2A, but includes additional information as well. In this example, the body contents of the email communication 292 include information 292*g* that identifies a particular product being ordered, and information 292*h* that indicates a quantity of the item that is ordered, such as by using tags in this example to identify product and quantity information. As previously discussed with respect to FIG. 2A, such data may be specified in other manners in other embodiments, such as by using XML format, using header information or information in the subject line, etc. In this example, the retailer user has previously configured the second search-related capability of the user data search service to receive such emails and to update stored user inventory data for the retailer user in a corresponding manner. In addition, in this example, the sending user for the email communication is indicated in header information 292*a* to be the same sending retailer user as in FIG. 2A, and the destination electronic communication address used in information 292*c* is similarly the same as was used in FIG. 2A. However, in the illustrated example, the subject line information in header field 292*d* includes alternative information with respect to that illustrated in FIG. 2A, and in particular, indicates in the example of FIG. 2E to provide an inventory update (by using configuration instruction keywords "Inventory:Update"). Thus, when the user data search service receives the electronic communication 292, the service updates the inventory information for the retailer user in the configured manner, which in this example includes decrementing the quantity of available copies of the ItemXYZ product by the indicated quantity of one. While the example email communication 292 of FIG. 2E was initiated in this example based on automated operations of a server computing system providing the Web page 250 to customer device, such an email communication 292 may be generated and sent in other manners in other embodiments, including in a manual manner by the administrator user (e.g., in a manner similar to that previously discussed with respect to FIG. 2C).

While the first and second configured search-related capabilities are distinctly initiated in the examples of FIG. 2A and FIG. 2E based in part on the corresponding instruction operation information in the subject line of the respective emails, it will be appreciated that in other embodiments such distinct searching capabilities may be accessed in other manners, including by using two distinct electronic communication addresses. Thus, the user data search service may instead use, for example, a first provided email address of "retailerABC_catalog@<user-data-search-service>.com" to receive catalog-related emails such as email 291 of FIG. 2A, and a second provided email address of "retailerABC_inventory@<user-data-search-service>.com" to receive inventory-related emails such as email 292 of FIG. 2E. The username for each of the one or more provided email addresses may in some embodiments be specified by the user as part of the initial configuration activities with the user data search service, or in other embodiments may be generated by the user data search service.

Returning to the example of FIG. 2D, the illustrated Web page 250 also includes additional information 270 about customer reviews that have been received from other customers of the retailer corresponding to the particular ItemXYZ product discussed in Web page 250. In addition, the Web page 250 includes a user-selectable control 275 to enable the current customer to create his or her own review for the product, and user-selectable controls 280 to enable the current customer to search other customer reviews. In the illustrated example, the functionality corresponding to controls 275 and 280 may each be configured to access additional distinct types of search-related capabilities for the retailer user from the user data search service. For example, with respect to the control 275 that enables the current customer to create his or her own review, in the illustrated example, the selection of the control 275 by the current customer initiates the creation of an email communication from that customer to the user data search service to include that customer's review information, with an example of such an email communication being illustrated with respect to FIG. 2F. For example, the selection of the control 275 may cause an email program on the customer's device to begin to execute (if not already executing) and to open a new email window, with which the customer may then interact to add contents and send the email.

In particular, in the example of FIG. 2F, an electronic communication 293 being sent to the user data search service is illustrated, in a manner similar to that previously discussed with respect to email communications 291 and 292 of FIGS. 2A and 2B, respectively. In this example, the header "Subject:" field information 293d corresponds to the customer's review title, and the contents 293i and 293j of the email communication body include additional information for the review, although in other embodiments only one of the types of information 293i and 293j may be used. In particular, in this example, the information 293i is free-form text entered by the customer, and the information 293j corresponds to a star-rating for the product (e.g., on a scale of 1-star to 5-star, with 5-star being the best).

In this example, the customer review information is being sent to a distinct electronic communication address provided by the user data search service to the retailer user, as illustrated in the header "To:" field information 293c of the email communication 293 (which in this example is "retailerABC_reviews@<user-data-search-service>.com"). However, it will be appreciated that in other embodiments the same destination email address may instead be used, such as with different configuration operation information being indicated (e.g., such as via instruction tags in the subject line, in the manner illustrated with respect to FIGS. 2A and 2E). In addition, in this example, the sending user information in header "From:" field information 293a of the example communication 293 corresponds to an email account of the current customer, such as if the selection of the control 275 in FIG. 2D initiates operation of an email-sending program on the customer's device (e.g., with the header information 293a-293c being supplied by the Web site of the retailer). In other embodiments, the email communication 293 may instead be created and sent by the Web browser program 240, such as based on the Web site of the retailer providing a corresponding Web form to the customer after selection of the control 275 of FIG. 2D (e.g., having user-editable fields in which the customer specifies one or more of the illustrated information types, such as the review title, the review text, and the review rating).

In the illustrated embodiment, after the user data search service receives the email communication 293, the contents of the review are stored by the user data search service along with other customer-supplied reviews, and an index is optionally generated with respect to all of the customer-supplied reviews. The stored data may then be used to satisfy later searching of customer reviews by customers, such as with respect to controls 280 of FIG. 2D, including to use the search index (if generated) to expedite the identification of relevant search results. Thus, for this type of data, the user data search service may be configured to store and later provide access to the data, without performing analysis or manipulation of the data (other than possibly generating a search index or otherwise organizing the data to facilitate later retrieval). In addition, any index generated in this example may be stored distinctly from an index created for the product catalog information supplied in FIG. 2A, and the two types of product catalog data and customer review data may further in some embodiments be stored separately from each other by the user data search service, while in other embodiments such data may be stored together but with the distinct search indexes being maintained.

While not illustrated in FIGS. 2A-2F, in other situations the information sent in one or more email communications to the user data search service may allow the use of hyperlinks or other references in the contents of the electronic communication, with such an included reference indicating distinct content stored elsewhere (e.g., corresponding to a particular resource available on the Internet or other network; corresponding to a storage repository that may include multiple types of stored data, such as may be provided by an online data storage service accessible to the user; etc.). If so, in at least some embodiments, and optionally as controlled by configuration information specified by the retailer user, the user data search service may further allow such links and other references to be included in such incoming electronic communications, and subsequently analyze the data for such an electronic communication by using each link or other reference to retrieve the corresponding data to which the link or reference corresponds, and then manipulating that retrieved data in a manner similar to that of other data contents of incoming electronic communications. For example, in the context of the customer review illustrated in email communication 293 of FIG. 2F, the customer may supply a link to indicate a corresponding alternative product that the customer is comparing to the current product, and the user data search service may retrieve information corresponding to the other product to include as part of the customer review or to otherwise associate with the customer review (e.g., to include the name and/or unique identifier of the alternative product as a searchable tag for the current customer review, even if the contents retrieved from the link are not illustrated as part of this customer review).

Thus, the use of the described techniques provides a variety of benefits in various embodiments. For example, users of a user data search service or other online service may supply data to the online service in a straightforward manner that is easy to use, by sending electronic communications to one or more electronic communication addresses provided by the online service, with the electronic communications including user-specific data in the electronic communications (e.g., in the communication body and/or attachments) or otherwise referencing external user-specific data. Furthermore, a variety of types of capabilities may be provided by such an online service with respect to the supplied data for a user, with the supplied data optionally being analyzed or otherwise manipulated in one or more manners, including in at least some embodiments to perform such data manipulation for a user in a manner that is configured by the user. The data supplied for a user may further be later retrieved by the user or by others authorized by the user in various manners, including via a programmatic interface made available by the online service.

As described above, various types of search-related capabilities may be configured by and provided to the user by embodiments of a user data search service. In addition, related types of capabilities may be provided by other types of online services in an analogous manner, such as, for example, an online data storage service (e.g., for specialized types of data, such as for music or image or video data; for any type of data, such as data being analyzed or used or generated as part of ongoing execution of one or more software programs; etc.), an online service that stores business-related data and provides corresponding services (e.g., an online customer relationship management service, an online employee relationship management service, etc.), an online social networking service, etc.

Returning to the illustrated environment 100 of FIG. 1, additional details are included regarding operation of the modules 180, 185 and 190 to provide the described techniques, and use of the user configuration data 184, user searchable data 186 and user search indexes 188, such as in conjunction with the examples of FIGS. 2A-2F.

In particular, the configuration module 180 of FIG. 1 operates as part of an online service being provided by the computing systems 105, and enables users of the online service to register for and configure various types of capabilities to be provided by the online service based on user data supplied to the online service via electronic communications. For example, if the online service is a user data search service as illustrated in FIG. 1, the configuration module 180 enables a user to configure various types of search-related capabilities to be provided by the user data search service, including to receive one or more electronic communication addresses to be used to supply user data to the user data search service, and to receive information about one of more separate search interfaces that may be used to perform search requests to later access the supplied user data.

Thus, for example, with respect to the examples of FIGS. 2A-2F, the retailer user may interact with the configuration module 180 to obtain the email addresses used for the email communications 291, 292 and 293, and to configure the types of search-related capabilities described for the retailer user to specify current product catalog data, to perform automatic transaction-related updates to product inventory data, and for customers to specify customer review data. In addition, the retailer user may interact with the configuration module 180 to obtain information about the one or more separate search interfaces to access stored user data, such as for customer searches of product catalog data, for customer searches of customer review data, and to enable the retailer user to access and optionally modify various product-related data (e.g., via an interactive interface via which the retailer user manually interacts with the user data search service). Additional details with respect to operation of the configuration module 180 are discussed with respect to FIG. 3.

In addition, the electronic communication data intake module 185 of FIG. 1 also operates as part of the online service being provided by the computing systems 105, and enables users of the online service to supply user data to the online service using one or more electronic communication addresses provided to the user by the online service. For example, if the online service is a user data search service as illustrated in FIG. 1, the data intake module 185 enables a user to supply various types of data to the user data search service for later searching, such as by using one or more electronic communication addresses provided to the user by the user data search service.

Thus, for example, with respect to the examples of FIGS. 2A-2F, the retailer user may perform or configure interactions with the data intake module 185 that involve sending the email communications 291, 292 and 293, such as to supply current product catalog data (e.g., as illustrated in FIG. 2A, such as based on manual operations of the retailer user), to supply updates to product inventory data (e.g., as illustrated in FIG. 2D with respect to customer-selected purchase control 266), and to supply customer review data (e.g., as illustrated in FIG. 2D with respect to customer-selected review creation control 275). Additional details with respect to operation of the data intake module 185 are discussed with respect to FIG. 4.

In addition, the data retrieval interface module 190 of FIG. 1 also operates as part of the online service being provided by the computing systems 105, and enables users of the online service to retrieve or otherwise access information based on user data previously supplied to the online service, such as by using one or more data retrieval interfaces made available to the user by the online service. For example, if the online service is a user data search service as illustrated in FIG. 1, the data retrieval interface module 190 enables a user to send search requests to the user data search service, and to receive corresponding portions of the supplied user data that satisfy any criteria of the search requests.

Thus, for example, with respect to the examples of FIGS. 2A-2F, the retailer user may perform or configure interactions with the data retrieval interface module 190 that involve retrieving product catalog data (e.g., as illustrated in FIG. 2B with respect to customer-selected product search controls 215), and retrieving customer review data (e.g., as illustrated in FIG. 2D with respect to customer-selected review search controls 280). Additional details with respect to operation of the data retrieval interface module 190 are discussed with respect to FIG. 5.

In addition, the user devices 110 are each illustrated as having various data files 160, an operating system 162, and one or more applications that include a Web application 164 (e.g., a browser program) and an electronic communication application 166 (e.g., an email program, a chat program, a texting program, etc.). In some embodiments and situations, particular user devices 110 may include additional hardware components (e.g., a non-volatile storage device, such as to store some or all of the data files 160 and software 162, 164 and 166; one or more computer-readable medium interfaces; etc.) and/or lack some of the illustrated hardware components. Similarly, particular user devices 110 may include additional software components and/or lack some of the illustrated software components.

The network 120 of FIG. 1 may be any appropriate type of network, including an intranet, the Internet, a cellular network, a public switched telephone network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, and the environment includes one or more network-accessible computing systems 125 that provide various content 172. In some embodiments, at least some of the electronic communications sent to the user data search computing systems 105 may also be automatically sent by one or more of the computing systems 125, such as for computing systems 125 that are configured to provide functionality for and/or information to a particular user registered with the user data search service. In some situations, an electronic communication sent to the user data search service by a user may include a link or other reference to particular content stored on a particular computing system 125 (or other network-accessible storage device), and if so the user data search service may retrieve that referenced content and include it with other user-supplied data for later searching or other user access.

It should be understood that there can be several application servers, layers, or other elements, processes, or components, which may be chained or otherwise configured, which can interact to perform tasks such as obtaining data from appropriate data storage. As used herein, the term "data storage" refers to any device or combination of devices capable of non-volatile storage, access, and retrieval of data, which may include any combination and number of data servers, databases, data storage devices, and data storage media, in any standard, distributed, or clustered environment. In addition, the term "memory" may refer to various types of memory, including volatile memory such as one or more types of RAM ("random access memory") (e.g., DRAM, or "dynamic RAM", SRAM, or "static RAM", etc.). The computing systems 105 may include additional hardware components that are not illustrated (e.g., various I/O interfaces, various computer-readable medium interfaces, etc.), including those discussed with respect to user devices 110, and the computing systems 125 may include hardware components similar to those of computing systems 105. Each computing system and device may include an operating system that provides executable program instructions for the general administration and operation of that system/device, and may include a computer-readable medium storing instructions that, when executed by a processor of the system/device, allow the system/device to perform its intended functions. It will also be appreciated that, while various items are discussed or illustrated as being stored in volatile memory or on non-volatile storage while being used, these items or portions of them can be transferred between memory and other storage devices for purposes of memory management and data integrity.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure. For example, a user data search service or other online service may instead be executed by multiple interacting computing systems or devices, and/or may include more or less modules than are illustrated (whether to include more or less types of functionality than are described, or to distribute the described types of functionality in other manners). In addition, the functionality of the described techniques may in some embodiments be integrated as part of one or more online services in the manner described, while in other embodiments may be provided by a separate system that interacts with one or more affiliated user data search services or other affiliated online services to provide the described techniques to those affiliated online services.

Thus, in some embodiments, some or all of the described techniques may be performed by hardware means that include one or more processors and/or memory and/or storage when configured by one or more software programs (e.g., a system to provide the user data search service) and/or data structures, such as by execution of software instructions of the one or more software programs and/or by storage of such software instructions and/or data structures. Furthermore, in some embodiments, some or all of the described techniques of the indicated systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on one or more non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

As noted, a user of a user data search service or other online service may be provided with access to user-specific data supplied to the online service in various manners in various embodiments. For example, the online service may provide one or more programmatically accessible search interfaces or other data retrieval interfaces, such as interfaces that may be programmatically accessed by an executing program of the user or of others on behalf of the user (e.g., by customers of a Web site provided by a retailer user). Such programmatically accessible interfaces may, for example, be part of an API of the online service, and may be accessible in various manners, including one or more of the following non-exclusive list: using XML over HTTP ("HyperText Transfer Protocol"), such as part of the REpresentational State Transfer ("REST"0 distributed interaction model that focuses on resources); using a Web services invocation, such as based on one or more of SOAP ("Simple Object Access Protocol") for standard message exchange, WSDL ("Web Services Description Language") for description of service invocations, and UDDI ("Universal Description, Discovery, and Integration service") for discovery of available services; using remote procedure call ("RPC") protocols; etc. In addition, the online service may also optionally provide one or more interactive interfaces via which the user may manually browse or search the user-specific data supplied for the user, such as based on the user using a Web browser or other client-side application program to access a GUI ("graphical user interface") provided by the online service, via which the user may interactively perform actions to review and optionally modify the user-specific data. For example, if the online service creates an account for each registered user, the interactive interface may include the user accessing his/her account.

In addition, a user may perform various types of interactions with the online service to specify configuration information, such as may be associated with the user's account (if any) with the online service. Such configuration-related interactions may include, for example, the user using a Web browser or other client-side application program to access a GUI provided by the online service, via which the user may perform one or more of the following non-exclusive list: specifying (or receiving information about a selection by the online service of) one or more electronic communication addresses to be provided by the online service, such as by specifying a distinct username or other portion of some or all such provided electronic communication addresses; specifying (or receiving information about a selection by the online service of) one or more types of user-specific information (e.g., a unique account name or user identifier), such as for use in identifying the user (and the user's account, if provided) when later accessing the online service (e.g., via a programmatic interface provided by the online service); specifying (or receiving information about predefined selections by the online service of) one or more types of data manipulation operations to be performed on some or all user-specific supplied data received in some or all electronic communications, such as to be associated with a particular electronic communication address and/or operation instruction included in an electronic communication; specifying (or receiving information about predefined selections by the online service of) of how the supplied data (e.g., of a particular data collection) is later accessible, such as by only the user, by specified other designated entity, by anyone, by someone acting under direction of the user or otherwise on behalf of the user (e.g., a customer of a Web site provided by a retailer user), etc.; specifying whether and/or how to generate search indexes for the supplied data (e.g., for one or more particular data collections); etc.

As previously noted, various types of data manipulation operations may be specified to be performed on some or all user-specific supplied data received in some or all electronic communications for a user, including one or more of the following non-exclusive list: aggregate all supplied data (e.g., by separately storing each piece or group of supplied data in a manner associated with the user, or instead combining each piece or group of supplied data into a single aggregated data collection), to enable some or all of the supplied data to later be accessed in a single integrated manner; separate the supplied data into multiple distinct collections (e.g., into different categories or types or fields of data), such that each distinct collection of data may later be accessed separately from other data collections; generate one or more search indexes for the supplied data, such as a distinct search index for each of multiple distinct data collections; generate summaries or other attributes for particular data collections, such as to determine a number of pieces or groups of data of a particular data collection that have the same values (e.g., for a data collection that is grouped based on a specified facet field); use at least some contents of electronic communications as parameters or values to other functions to be performed, such as to perform mathematical operations based on such contents (e.g., to increase or decrease an inventory count of a product based on quantity information supplied in data contents); etc. More generally, in at least some embodiments, the data manipulation operations may include any type of data gathering or modification activities that are specified.

As previously noted, one or more types of electronic communications may be used by a user of an online service in at least some embodiments, including one or more of the following non-exclusive list: email communications; text message communications, such as an SMS ("Short Message Service") message or an MMS ("Multimedia Messaging Service") message; online chat or instant messaging messages; electronic messages posted to an electronic account or storage repository that is accessible by other users, such as an Internet bulletin board or message board, a social networking site account of the user, a blog or microblog site or account associated with the user (e.g., for tweets), etc.; video communications using Internet-based (or other network-based) voice messaging functionality; etc.

In addition, as previously noted, in at least some embodiments the electronic communications that are sent to a user's electronic communication address provided by an online service may be sent by the user, or otherwise directed by the user (e.g., electronic communications that are triggered by actions of customers of a retailer user's Web site, based on configuration of the Web site by the retailer user). In other embodiments and situations, such electronic communications may be sent by other types of users and other situations. For example, the user may register the provided electronic communication address with a third-party service that provides information of a specified type, to enable that provided information to be stored b the online service and later accessed by the user—non-exclusive examples of such a third-party service include a news aggregation service, an RSS feed, a blog recipient for a specified blog, a service with which the user has an account and for which account-related information is sent, etc.

Accordingly, the described techniques may be used in a variety of situations by various users in various embodiments, as described herein.

FIG. 3 is a flow diagram of an example embodiment of a routine 300 for configuring search capabilities to be provided to users on user-specific bases. The routine may be provided by, for example, execution of the user search configuration module 180 of FIG. 1, such as to receive and respond to requests to provide configurable search-related capabilities to users. While the functionality of the illustrated embodiment of routine 300 is provided with respect to a user data search service, it will be appreciated that similar functionality may be provided in other embodiments for other types of online services in an analogous manner.

The illustrated embodiment of the routine begins at block 310, where information is received from a user related to providing configurable search capabilities. For example, in at least some embodiments, the information in block 310 may be received as part of an initial registration of the user with a user data search service, such as to create an account of the user with the service, although in other situations the information may be received from a user who is already registered with the user data search service and is modifying the search-related capabilities being provided. As discussed in greater detail elsewhere, a particular user may in some embodiments and situations configure one or more types of search-related capabilities to be provided by the user data search service, such as to specify different types of searching operations that are available, different ways to aggregate intake data that is received by the user data search service, etc. Alternatively, in some embodiments and situations, a user may merely register for an account with the user data search service without providing any user-specific configuration information, such as if the user will instead initially rely on default search-related capabilities provided by the user data search service. Furthermore, in some embodiments, at least some users may access and obtain at least some functionality of the user data search service without explicitly registering with the service or creating a user account with the service.

After block 310, the routine continues to block 320 to provide one or more electronic communication addresses to the user, for use in later supplying intake data for the user to the user data search service. As discussed in greater detail elsewhere, in some embodiments the user data search service generates one or more such electronic communication addresses that are affiliated with the user data search service, such that an electronic communication sent to that electronic communication address will be forwarded to the user data search service, and associates those generated electronic communication addresses with the user. In other embodiments, the electronic communication addresses may be provided in other manners, including to allow the user to configure at least some of the electronic communication address (e.g., an initial username portion, rather than the email domain). In addition, as previously noted, the one or more electronic communication addresses may be of one or more types, such as to provide multiple electronic communication addresses that are of different types, or instead that are of a single type but have different configured search capabilities.

After block 320, the routine continues to block 330 to configure and provide information to the user regarding at least one search interface for use in accessing the search-related capabilities provided to the user, with at least one of the provided search interfaces being accessed separately from the electronic communication addresses. As one example, the user data search service may provide one or more APIs to enable various users to access searching capabilities of the user data search service, with the current user receiving access to an interface specific to the user (e.g., based on the user supplying user-specific information as parameters to a shared API call, such as a user-specific identifier, user password or other credentials, etc.).

After block 330, the routine continues to block 350 to store information for the user related to the configurable search-related capabilities to be provided to the user, in association with the provided one or more electronic communication addresses and information for use as part of the provided one or more search interfaces. After block 350, the routine continues to block 395 to determine whether to continue, such as until an explicit indication to terminate is received. If it is determined to continue, the routine returns to block 310, and otherwise continues to block 399 and ends.

FIG. 4 is a flow diagram of an example embodiment of a routine 400 for receiving and manipulating supplied data for particular users, to enable that data to be later retrieved. The routine may be provided by, for example, execution of the electronic communication data intake module 185 of FIG. 1, such as to receive incoming electronic communications that are sent using electronic communication addresses provided to particular users. While the functionality of the illustrated embodiment of routine 400 is provided with respect to a user data search service, it will be appreciated that similar functionality may be provided in other embodiments for other types of online services in an analogous manner.

The illustrated embodiment of the routine begins at block 410, where an electronic communication is received via an electronic communication address provided for a user. In block 420, the user is identified based on the electronic communication address used, and configuration information for that user (if any) that is associated with the electronic communication address is received. In some embodiments and situations, a particular user may use default search-related capabilities provided by the user data search service rather than particular configured capabilities, and if so, information about the default capabilities may instead be retrieved from block 420. Alternatively, in some embodiments and situations, a particular user may use search-related capabilities that merely include receiving and storing supplied data, and later searching that data, such as previously described with respect to the example customer review data discussed in FIGS. 2A-2F.

After block 420, the routine continues to block 430 to retrieve data contents of the received electronic communication in accordance with any configuration information for the user. In some embodiments, the retrieval of data contents may include one or more of the following: retrieving contents of a body of the electronic communication; retrieving contents of each of one or more file attachments to the electronic communication; retrieving contents of a document or other object that is linked to or otherwise referenced by a link in the electronic communication; etc. In block 440, the routine then updates stored data for the user based on the retrieved data contents, in accordance with any specified configuration information. As discussed in greater detail elsewhere, in some embodiments and situations, the retrieved data contents may merely be added to any existing stored data for the user, such as to enable any or all of the stored data to later be retrieved (e.g., in response to a corresponding search request). In other embodiments and situations, the analysis and updating of the stored data may include performing particular operations on the retrieved data contents and/or the stored data for the user, such as to update or replace existing stored data in accordance with the retrieved data contents of the electronic communication. In addition, in some embodiments, the retrieval of the data contents and the updating of the stored data may include using particular instructions specified in the electronic communication, including tags or parameters that are specified in a header and/or body of the electronic communication.

After block 440, the routine continues to block 450 to optionally provide a confirmation response to the sender of the electronic communication and/or another recipient designated in configuration information for the user. While not illustrated here, in other embodiments the optional confirmation response may be followed by one or more additional communications from the sender to provide additional instructions related to the updating of stored data for the user, and if so those additional instructions may be followed in such situations in accordance with corresponding configuration information for the user. After block 450, the routine continues in the illustrated embodiment to block 460 to index the stored data for the user for later retrieval, although in other embodiments the indexing may not be performed (e.g., based at least in part on the types of aggregation of stored data that is performed).

After block 460, the routine continues to block 495 to determine whether to continue, such as until an explicit indication to terminate is received. If it is determined to continue, the routine returns to block 410, and otherwise continues to block 499 and ends.

Figure 5:
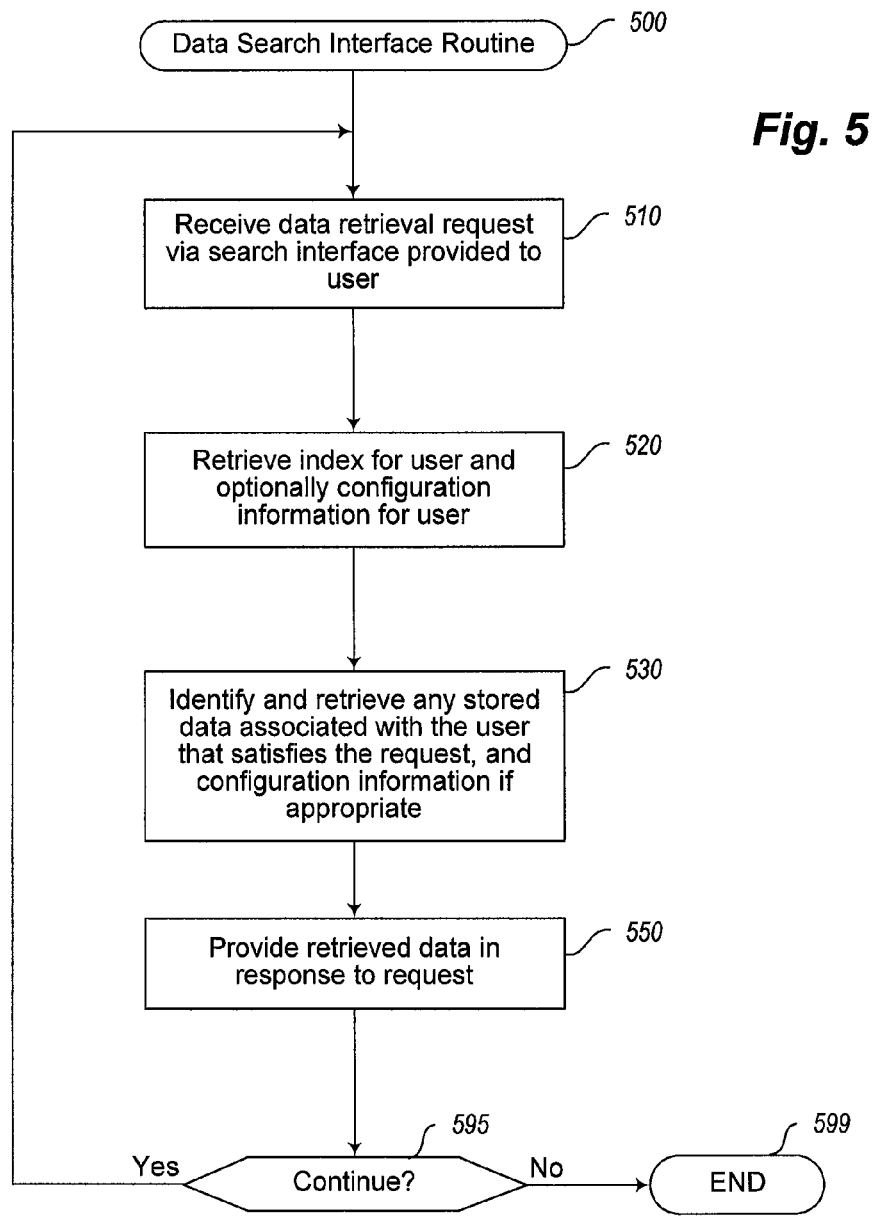
FIG. 5 is a flow diagram of an example embodiment of a data search routine for use with an example user-specific data search service.

FIG. 5 is a flow diagram of an example embodiment of a routine 500 for receiving and responding to requests to retrieve stored data for particular users. The routine may be provided by, for example, execution of the data search interface module 190 of FIG. 1, such as to receive a search request or other data retrieval request using an interface specific to a particular user, and to respond accordingly. While the functionality of the illustrated embodiment of routine 500 is provided with respect to a user data search service, it will be appreciated that similar functionality may be provided in other embodiments for other types of online services in an analogous manner.

The illustrated embodiment of the routine begins at block 510, where a data retrieval request is received via a search interface specific to a particular user. In block 520, the routine then identifies the user based on the search interface used, and retrieves a previously stored index (if any) for the user. In embodiments and situations in which search indexes are not used, other indications of the stored data for the user may instead be retrieved, such as to allow a non-indexed search of the stored user data.

After block 520, the routine continues to block 530 to identify and retrieve any stored data for the user that satisfies the received request, such as based on any search criteria that are specified, and optionally in accordance with any configuration information specified for the user related to data retrieval operations. In block 550, the data that is retrieved is then provided in response to the request. While not illustrated here, in some embodiments, the data requests may further specify one or more types of operations to be performed on the retrieved data before it is provided, and if so such operations may be further performed in accordance with any corresponding configuration information for the user.

After block 550, the routine continues to block 595 to determine whether to continue, such as until an explicit indication to terminate is received. If it is determined to continue, the routine continues to block 510, and otherwise continues to block 599 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, including with respect to database data structures and Web page data structures, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method comprising:
providing, by one or more configured computing systems, a search service that uses electronic communications to supply data to the search service, the search service having a programmatically accessible search interface for use by users of the search service;
providing, by the one or more configured computing systems, a first user of the search service with one or more electronic communication addresses for use in supplying data associated with the first user to the search service, the one or more electronic communication addresses including a first electronic communication address that has a first associated type of data manipulation operation to be applied to data contents of electronic communications sent to the first electronic communication address, the one or more electronic communication addresses being distinct from the programmatically accessible search interface;
receiving, by the one or more configured computing systems, one or more electronic communications sent to the first electronic communication address;
performing, by the one or more configured computing systems, the first associated type of data manipulation operation on data contents of the received one or more electronic communications, and storing results of the performed first associated type of data manipulation operation in a manner associated with the first user; and
after receiving a search request that is programmatically supplied to the programmatically accessible search interface by an executing program on behalf of the first user, providing search results that are based on the stored results.

2. The method of claim 1 further comprising, before the receiving of the one or more electronic communications, receiving configuration information from the first user that indicates the first associated type of data manipulation operation, and associating the first associated type of data manipulation operation with the first electronic communication address in response to the received configuration information.

3. The method of claim 1 wherein the one or more electronic communication addresses include a second electronic communication address having a second associated type of data manipulation operation that is distinct from the first associated type of data manipulation operation.

4. The method of claim 3 further comprising:
receiving one or more additional electronic communications that are sent to the second electronic communication address;
performing the second associated type of data manipulation operation on data contents of the received additional electronic communications;
storing results of the performed second associated type of data manipulation operation in a manner associated with the first user; and
in response to a second search request, providing search results that are based on the stored results of the performed second associated type of data manipulation operation.

5. The method of claim 1 further comprising receiving one or more further electronic communications that are sent to a second electronic communication address of the one or more electronic communication addresses and include a first instruction associated with the first type of associated data manipulation operation, and performing the first type of associated data manipulation operation on data contents of the received further electronic communications based on the included first instruction.

6. The method of claim 5 further comprising:
receiving one or more additional electronic communications that are sent to one of the one or more electronic communication addresses and that include a second instruction associated with a second type of associated data manipulation operation that is distinct from the first type of data manipulation operation;

performing the second type of data manipulation operation on data contents of the received additional electronic communications based on the included second instruction; and storing the data contents of the received additional electronic communications for the first user after the performing of the second type of data manipulation operation.

7. The method of claim 1 further comprising receiving multiple electronic communications for the first user that include multiple different groups of data contents, and generating multiple distinct search indexes that each correspond to one of the multiple different groups of data contents, and wherein the providing of the search results includes using one of the generated search indexes.

8. The method of claim 1 wherein the search service further provides a second search interface that is available for interactive use by the users of the search service, and wherein the method further comprises receiving a second search request from the first user via one or more interactions with the second search interface, and supplying second search results to the first user from the stored results in response to the second search request.

9. The method of claim 1 wherein at least one of the received electronic communications has at least one attached document, and wherein the performing of the first associated type of data manipulation operation is performed at least in part on contents of the at least one attached document.

10. The method of claim 1 wherein at least one of the received electronic communications includes a reference to data stored externally to the at least one received electronic communication, wherein the method further comprises retrieving the data stored externally, and wherein the performing of the first associated type of data manipulation operation is performed at least in part on the retrieved data.

11. The method of claim 1 wherein the received electronic communications are email communications, text message communications, or communications posted to an electronic account of the first user that is accessible by other users.

12. The method of claim 1 wherein the received one or more electronic communications include multiple electronic communications sent by multiple distinct entities.

13. A non-transitory computer-readable medium whose stored contents configure a computing system to perform a method, the method comprising:

configuring, by the configured computing system, data retrieval capabilities for a first user, the configuring including associating a first electronic communication address with the first user and including providing to the first user access to a first data retrieval interface that is accessed distinctly from the first electronic communication address, the configuring further including associating a first type of data manipulation operation with the first electronic communication address that is to be applied to data contents of electronic communications sent to the first electronic communication address;

receiving one or more electronic communications that are sent to the first electronic communication address;

performing, by configured computing system, the first type of data manipulation operation on data contents of the received one or more electronic communications, and storing results of the performed first type of data manipulation operation in a manner associated with the first user; and after receiving a request via the first data retrieval interface, providing a response including data that is based on the stored results.

14. The non-transitory computer-readable medium of claim 13 wherein the configured computing system is part of a search service that provides data retrieval capabilities to multiple additional users of the search service that are distinct from the first user and that provides the first data retrieval interface for use by the first user and the multiple additional users, wherein the first data retrieval interface is a programmatically accessible search interface, wherein the request received via the first data retrieval interface is a search request that is programmatically supplied by an executing program on behalf of the first user, and wherein the method further comprises, for each additional user of the multiple additional users:

providing an electronic communication address to the additional user that is distinct from any other electronic communication addresses provided to any other users of the search service;

storing data contents that are received via one or more additional communications sent to the electronic communication address provided to the additional user, the stored data contents being associated with the additional user and being stored distinctly from other data contents stored for any other users of the search service; and in response to a search request received on behalf of the additional user, providing a response that includes a portion of the stored data contents associated with the additional user and not any other data contents stored for any other users of the search service.

15. The non-transitory computer-readable medium of claim 13 wherein the configured computing system is part of a search service that provides the first electronic communication address to the first user for use in supplying data associated with the first user to the search service, and wherein the method further comprises generating and storing an index for the stored results that is used in the providing of the response.

16. The non-transitory computer-readable medium of claim 13 wherein the method further comprises receiving configuration information from the first user that indicates the first types of data manipulation operation, and wherein the associating of the first type of data manipulation operation with the first electronic communication address is performed based on the received configuration information.

17. The non-transitory computer-readable medium of claim 16 wherein the first type of data manipulation operations includes updating numeric data stored for the first user in accordance with one or more mathematical functions based on at least some of the data contents of the received electronic communications.

18. The non-transitory computer-readable medium of claim 13 wherein the stored contents are instructions that when executed program the configured computing system to perform the method.

19. A computing system, comprising:
one or more processors; and
one or more modules that are configured to, when executed by at least one of the one or more processors, provide a search service that uses electronic communications to supply data to the search service and that has a programmatically accessible search interface for use in data retrieval by a first user of the search service, the providing of the search service including:

associating a first electronic communication address with the first user;

receiving one or more electronic communications that are sent to the first electronic communication address;

storing data contents of the received electronic communications in a manner associated with the first user, wherein the first electronic communication address is provided to the first user by the search service for use in supplying data associated with the first user to the search service, wherein the providing of the search service further includes receiving configuration information from the first user that indicates one or more types of data manipulation operations to perform on data contents of electronic communications sent to the first electronic communication address, and wherein the storing of the data contents of the received electronic communications includes performing at least one of the indicated types of data manipulation operations on the data contents before the storing; and after receiving a search request that is programmatically supplied to the programmatically accessible search interface by an executing program, providing a response that is based on the stored data contents.

20. The computing system of claim 19 wherein the first electronic communication address is provided to the first user by the search service for use in supplying data associated with the first user to the search service, and wherein the providing of the search service further includes, for each additional user of multiple additional users of the search service:

providing an electronic communication address to the additional user that is distinct from any other electronic communication addresses provided to any other users of the search service;

storing data contents that are received via one or more additional communications sent to the electronic communication address provided to the additional user, the stored data contents being associated with the additional user and being stored distinctly from other data contents stored for any other users of the search service; and in response to a search request received on behalf of the additional user, providing a response that includes a portion of the stored data contents associated with the additional user and not any other data contents stored for any other users of the search service.

21. The computing system of claim 19 wherein the one or more modules of the search service include software instructions for execution by at least one of the one or more processors.

22. The computing system of claim 19 wherein the one or more modules of the search service consist of one or more means for performing the providing of the search service.

* * * * *